(12) United States Patent
Pusdesris et al.

(10) Patent No.: US 10,990,403 B1
(45) Date of Patent: Apr. 27, 2021

(54) PREDICTING AN OUTCOME OF AN INSTRUCTION FOLLOWING A FLUSH

(71) Applicant: Arm Limited, Cambridge (GB)

(72) Inventors: Joseph Michael Pusdesris, Austin, TX (US); Yasuo Ishii, Austin, TX (US); Muhammad Umar Farooq, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/752,995

(22) Filed: Jan. 27, 2020

(51) Int. Cl.
*G06F 9/30* (2018.01)
*G06F 9/38* (2018.01)
*G06F 9/48* (2006.01)

(52) U.S. Cl.
CPC ......... *G06F 9/3842* (2013.01); *G06F 9/3804* (2013.01); *G06F 9/3855* (2013.01); *G06F 9/48* (2013.01)

(58) Field of Classification Search
None
See application file for complete search history.

(56) References Cited

U.S. PATENT DOCUMENTS

| | | | | |
|---|---|---|---|---|
| 6,006,317 | A * | 12/1999 | Ramagopal | G06F 9/3834 711/137 |
| 6,694,425 | B1 * | 2/2004 | Eickemeyer | G06F 9/3851 712/216 |
| 10,846,097 | B2 * | 11/2020 | Jumani | G06F 9/3806 |
| 2004/0255104 | A1 * | 12/2004 | Akkary | G06F 9/3861 712/239 |
| 2005/0138480 | A1 * | 6/2005 | Srinivasan | G06F 9/3842 714/38.1 |
| 2016/0350116 | A1 * | 12/2016 | Reddy | G06F 9/30058 |

OTHER PUBLICATIONS

Mutlu et al.; On Reusing the Results of Pre-Executed Instructions in a Runahead Execution Processor; 2006; IEEE (Year: 2006).*
Akkary et al.; Recycling Waste: Exploiting Wrong-Path Execution to Improve Branch Prediction; 2003; ACM (Year: 2003).*
U.S. Appl. No. 16/806,063, filed Mar. 2, 2020, Ishii et al.
U.S. Appl. No. 16/891,431, filed Jun. 3, 2020, Ishii et al.
Office Action dated Feb. 2, 2021 for U.S. Appl. No. 16/891,431, 7 pages.

* cited by examiner

*Primary Examiner* — Corey S Faherty
(74) *Attorney, Agent, or Firm* — Nixon & Vanderhye P.C.

(57) ABSTRACT

An apparatus is described, comprising processing circuitry to speculatively execute an earlier instruction and a later instruction by generating a prediction of an outcome of the earlier instruction and a prediction of an outcome of the later instruction, wherein the prediction of the outcome of the earlier instruction causes a first control flow path to be executed. The apparatus also comprises storage circuitry to store the outcome of the later instruction in response to the later instruction completing, and flush circuitry to generate a flush in response to the prediction of the outcome of the earlier instruction being incorrect. When re-executing the later instruction in a second control flow path following the flush, the processing circuitry is adapted to generate the prediction of the outcome of the later instruction as the outcome stored in the storage circuitry during execution of the first control flow path.

20 Claims, 8 Drawing Sheets

502 — if (hard to predict cond$^n$){
...
}
504 — if (hard to predict cond$^n$){
...
}

FIG. 5A

510 — for (i=0; i<N; i++){
506 — if(A){
}
508 — if(B){
}
}

FIG. 5B

```
512 ── for (i=0; N<0; i++){
    506 ── if(A){
            }
    508 ── if(B){
            }
    514 ── if(C){
            }
```

FIG. 5C

PREDICTING AN OUTCOME OF AN INSTRUCTION FOLLOWING A FLUSH

BACKGROUND

Technical Field

The present technique relates to the field of data processing. More particularly, the present technique relates to speculative execution of instructions.

Technical Background

In a data processing system, instructions can be executed speculatively. For example, control flow path altering instructions determine which sequence of later instructions (control flow path) will subsequently be executed. A particular example of a control flow path altering instruction is a branch instruction.

In such systems, execution of a control flow path altering instruction can involve predicting the control flow path altering instruction's outcome, before the instruction has been executed. This allows the data processing system to speculatively execute later instructions on the control flow path indicated by the predicted outcome of the control flow path altering instruction.

Speculative execution of instructions in this way allows the later instructions to be executed sooner than would be possible if the data processing system was forced to wait until the outcome of the earlier instruction was known, which may improve the performance of the data processing system. If the prediction of the outcome of the control flow path altering instruction is later determined to have been incorrect, the later instructions executed from the incorrect control flow path are flushed from the pipeline of the data processing system, with the data processing system then executing instructions on the correct control flow path.

SUMMARY

Viewed from one example, the present technique provides an apparatus comprising: processing circuitry to speculatively execute an earlier instruction and a later instruction by generating a prediction of an outcome of the earlier instruction and a prediction of an outcome of the later instruction, wherein the prediction of the outcome of the earlier instruction causes a first control flow path to be executed; storage circuitry to store the outcome of the later instruction in response to the later instruction completing; and flush circuitry to generate a flush in response to the prediction of the outcome of the earlier instruction being incorrect, wherein when re-executing the later instruction in a second control flow path following the flush, the processing circuitry is adapted to generate the prediction of the outcome of the later instruction as the outcome stored in the storage circuitry during execution of the first control flow path.

Viewed from another example, the present technique provides a method comprising: speculatively executing an earlier instruction and a later instruction by generating a prediction of an outcome of the earlier instruction and a prediction of an outcome of the later instruction, wherein the prediction of the outcome of the earlier instruction causes a first control flow path to be executed; storing the outcome of the later instruction in response to the later instruction completing; generating a flush in response to the prediction of the outcome of the earlier instruction being incorrect; and when re-executing the later instruction in a second control flow path following the flush, generating the prediction of the outcome of the later instruction as the outcome stored during execution of the first control flow path.

Viewed from another example, the present technique provides an apparatus comprising: means for speculatively executing an earlier instruction and a later instruction by generating a prediction of an outcome of the earlier instruction and a prediction of an outcome of the later instruction, wherein the prediction of the outcome of the earlier instruction causes a first control flow path to be executed; means for storing the outcome of the later instruction in response to the later instruction completing; means for generating a flush in response to the prediction of the outcome of the earlier instruction being incorrect; and means for generating the prediction of the outcome of the later instruction as the outcome stored during execution of the first control flow path, when re-executing the later instruction in a second control flow path following the flush.

Further aspects, features and advantages of the present technique will be apparent from the following description of examples, which is to be read in conjunction with the accompanying drawings.

BRIEF DESCRIPTION OF THE DRAWINGS

FIGS. 5A, 5B and 5C illustrate examples of instruction streams with convergent control flow paths;

DESCRIPTION OF EXAMPLES

Figure 1:
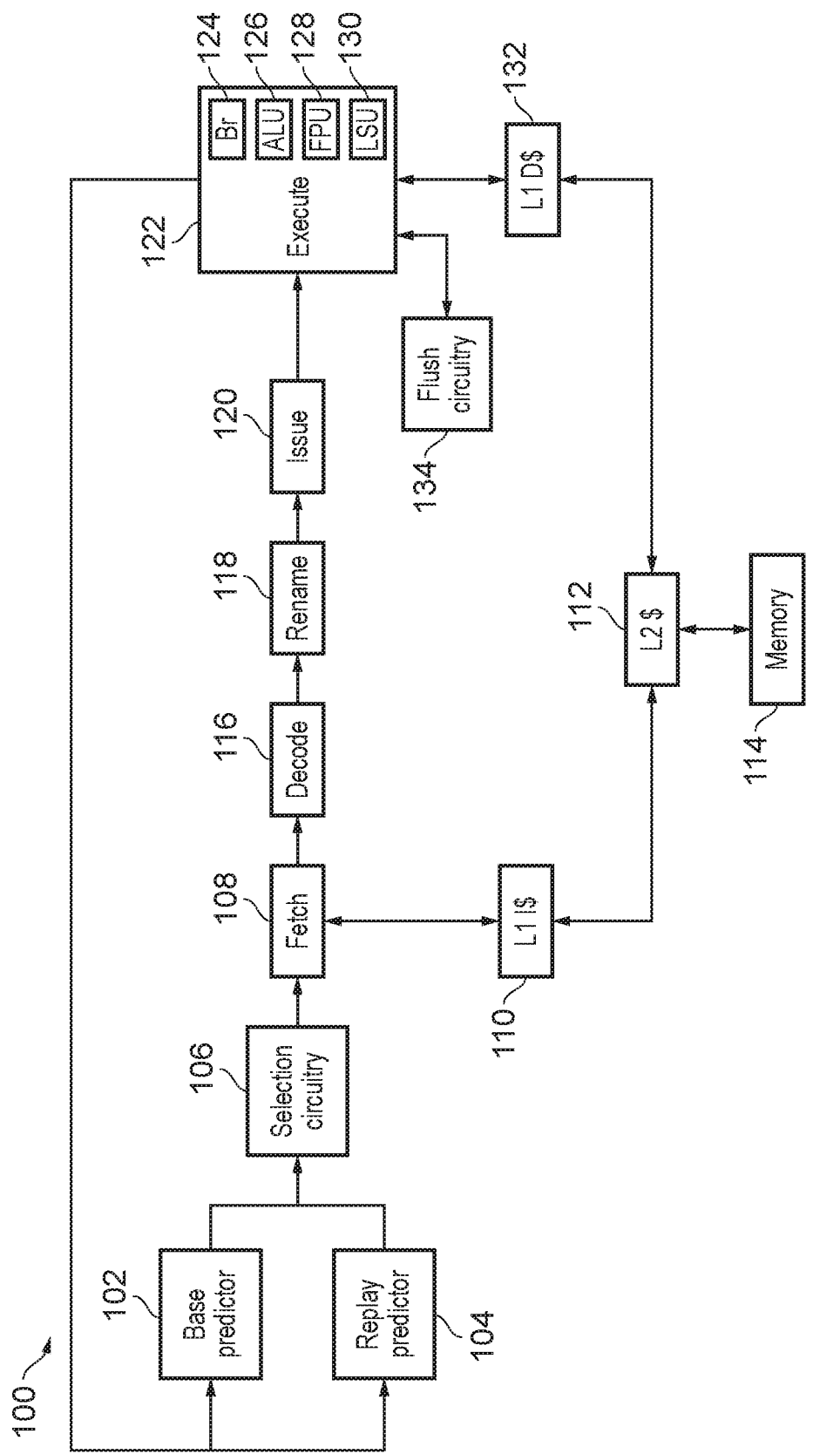
FIG. 1 illustrates a data processing apparatus in accordance with the present technique.

In a data processing system, the outcome of an earlier instruction may be predicted, allowing later instructions to be fetched and speculatively executed in dependence on the prediction. For example, the outcome of the earlier instruction could indicate a control flow path to be followed by the processing circuitry, and the processing circuitry can speculatively execute instructions on that control flow path in response to a prediction of the outcome. Speculatively executing instructions in this way allows the instructions on the predicted control flow path to be executed earlier than if speculative execution was not allowed, providing significant performance benefits.

However, in the event that the prediction of the outcome of the earlier instruction is subsequently determined to be incorrect, execution of any later instructions (e.g. instructions on the predicted control flow path) are undone or rewound, in order to avoid damage or security issues that may be caused by executing and completing the incorrect instructions. This could involve, for example, flushing the processing circuitry to prevent completion of any instructions occurring after the earlier instruction, and instead executing the instructions on the correct control flow path. However, there is a significant performance cost associated with performing a flush and the time spent executing the wrong instructions is wasted. This is especially true if the correct control path also includes some of the same instructions that were rewound. It would thus be advantageous to be able to improve the performance of the processing circuitry in the re-execution of instructions.

In some examples of the present technique, there is provided an apparatus comprising processing circuitry to speculatively execute an earlier instruction and a later instruction by generating a prediction of an outcome of the earlier instruction and a prediction of an outcome of the later instruction, wherein the prediction of the outcome of the earlier instruction causes a first control flow path to be executed; storage circuitry to store the outcome of the later instruction in response to the later instruction completing and flush circuitry to generate a flush in response to the prediction of the outcome of the earlier instruction being incorrect, wherein when re-executing the later instruction in a second control flow path following the flush, the processing circuitry is adapted to generate the prediction of the outcome of the later instruction as the outcome stored in the storage circuitry during execution of the first control flow path.

By storing the outcome of the later instruction in the storage circuitry, and using the stored outcome as the prediction when re-executing the later instruction, the present technique allows the time and processing power required to re-execute the later instruction to be reduced. This leads to an increase in the efficiency of the apparatus and an improvement in performance. In particular, the prediction of the later instruction can be more rapidly determined, allowing subsequent instructions to be fetched and speculatively executed. Moreover, basing the predicted outcome of the later instruction on the result of an actual execution of the instruction allows a more accurate prediction to be obtained, reducing the likelihood of a further flush being generated and, as a result, improving the performance of the apparatus.

The storage circuitry could be any form of storage circuitry; for example, it could be a dedicated storage circuit, or it could be a region within system memory.

In some examples, the first control flow path and the second control flow path each comprise the later instruction.

The present technique is particularly beneficial in cases where the later instruction does not directly depend on the outcome of the earlier instruction, and is thus on both the incorrect control flow path (first control flow path) and the correct control flow path (second control flow path). In such cases, an identical (later) instruction would be re-executed following the flush, even though its result is unlikely to have changed. It is thus especially advantageous to reduce the power consumption and increase the speed of the re-execution of the later instruction in such a situation, by using the result of the previous execution of the later instruction as a prediction, employing the storage circuitry of the present technique.

In some examples, the earlier instruction is earlier in a predefined program order than the later instruction, and the processing circuitry completes execution of the later instruction before the flush is completed.

Out-of-order execution of the earlier instruction and the later instruction in this way allows the instructions to be executed in an order governed by, for example, the availability of input data or execution units, rather than by their original order in a program (the predefined program order). The completion of the later instruction prior to the flush means that the outcome of the later instruction is known and can be stored before the flush completes.

In some examples, the later instruction and the earlier instruction are issued out of order with respect to the program order.

In such examples, the later instruction is executed before the earlier instruction, causing the result of the later instruction to be known before the flush (triggered by the incorrect prediction of the earlier instruction) completes. In this situation, the present technique is particularly advantageous, because the result of the later instruction is known—and therefore can be stored—before the instruction is flushed from the processing circuitry.

Alternatively, it may be that the earlier instruction and the later instruction are executed in order, but that the later instruction is executed more quickly than the earlier instruction, allowing its result to be known before the flush has completed. The present technique is also useful in this situation since, again, the result of the later instruction is known—and therefore can be stored—before the instruction is flushed from the processing circuitry.

In some examples, the storage circuitry stores a validity indicator indicative of whether the later instruction completed in the first control flow path: and the processing circuitry generates the prediction of the outcome of the later instruction as the outcome stored in the storage circuitry during execution of the first control flow path when the validity indicator indicates that the later instruction has previously been completed.

In this way, the processing circuitry can determine, using the validity indicator, whether an accurate prediction of the outcome of the later instruction is stored in the storage circuitry. This reduces the likelihood of an incorrect prediction being made, and therefore improves the performance of the apparatus, by reducing the likelihood of a further flush being generated.

In some examples, the processing circuitry executes a plurality of iterations of the earlier instruction and a plurality of iterations of the later instruction; the storage circuitry stores a plurality of outcomes of the later instruction, each corresponding to one of the plurality of iterations of the later instruction; and for each iteration of the later instruction, when re-executing that iteration of the later instruction in the second control flow path following the flush, the processing circuitry is adapted to generate the prediction of that iteration of the outcome of the later instruction as the outcome stored in the storage circuitry for that iteration during execution of the first control flow path.

The storage circuitry stores the outcome of each of a plurality of iterations of the same later instruction, allowing the outcome of any particular iteration of the later instruction to be predicted with accuracy. This allows the present technique to be applied regardless of how many iterations of the later instruction are executed before the flush is generated. For example, this can be useful in situations where the earlier instruction and the later instruction are instructions within a "for", "while", or "do" loop, each being iterated multiple times. It is therefore useful for the storage circuitry of the present technique to be able to store the outcomes of multiple iterations of the same instruction.

In some examples, the apparatus comprises pointer storage circuitry to store a pointer indicating which of the plurality of outcomes of the later instruction corresponds to a current iteration of the later instruction.

The pointer allows the processing circuitry to determine which of the plurality of outcomes corresponds to the current iteration of the later instruction, to enable the outcome of that iteration to be correctly predicted and/or stored to the correct position within the storage circuitry. This improves the accuracy of the predictions made using the present technique.

In some examples, the pointer is advanced following each prediction of the later instruction; and following the flush, the pointer is returned to a state occupied by the pointer when the earlier instruction was predicted.

This allows the pointer to correctly identify the outcome corresponding to the current iteration of the later instruction, so that the corresponding outcome can be retrieved or stored in the correct location.

In some examples, the processing circuitry speculatively executes a plurality of later instructions by generating predictions of a plurality of outcomes, each corresponding to one of the plurality of later instructions; and the storage circuitry stores the plurality of outcomes, wherein each of the plurality of outcomes is stored in response to a corresponding one of the plurality of later instructions completing.

When multiple later instructions are executed on the incorrect control flow path (the first control flow path), the present technique can still be applied to generate predictions for those instructions when they are re-executed following a flush.

In some examples, the storage circuitry stores the outcomes of the plurality of later instructions as a circular bit vector.

A circular bit vector is a particularly compact and efficient way of storing the outcomes of the plurality of later instructions in the storage circuitry, requiring minimal circuit area. Each bit in the bit vector may correspond to one of the outcomes of the plurality of later instructions.

In some examples, the storage circuitry stores a plurality of validity indicators as a further circular bit vector, wherein each of the plurality of validity indicators is indicative of whether a corresponding one of the plurality of later instructions completed in a previous control flow path.

As discussed above, the use of a validity indicator reduces the likelihood of an incorrect prediction being made, and therefore improves the performance of the apparatus. Also, as discussed above, storing data elements such as validity indicators as a circular bit vector is particularly compact and efficient, with each bit of the bit vector corresponding to one of the validity indicators.

In some examples, the apparatus comprises further prediction circuitry to generate a further prediction of the outcome of the later instruction; and prediction selection circuitry to select, as a selected prediction, the prediction of the outcome of the later instruction or the further prediction of the outcome of the later instruction.

By providing selection circuitry to select between the prediction of the outcome of the later instruction and the further prediction generated by the further prediction circuitry, the present technique can be used alongside existing prediction circuitry such as branch predictors and value predictors. This allows the present technique to be more easily integrated into existing systems, and provides the additional advantage of enabling a prediction (the further prediction) to be available even when the outcome stored in the storage circuitry is unavailable (for example, if the later instruction has not previously been executed, meaning that there is no outcome stored in the storage circuitry of the present technique) or inaccurate.

In some examples, the storage circuitry stores a validity indicator indicative of whether the later instruction has previously completed; the processing circuitry generates the prediction of the outcome of the later instruction as the outcome stored in the storage circuitry during execution of the first control flow path when the validity indicator indicates that the later instruction has previously been completed; and unless the validity indicator indicates that the later instruction has previously completed, the prediction selection circuitry selects the further prediction of the outcome of the later instruction as the selected prediction.

As discussed above, the use of a validity indicator reduces the likelihood of an incorrect prediction being made, and therefore improves the performance of the apparatus. In this case, the validity indicator is also used to determine which of two predictions to use as the predicted outcome of the later instruction. In particular, the outcome stored in the storage circuitry will generally be the most accurate prediction, since it corresponds to a real (recent) execution of the later instruction. Therefore, by selecting this outcome unless the validity indicator indicates that the later instruction has not previously completed, the accuracy of the generated prediction can be improved, reducing the likelihood of a further flush being generated.

In some examples, the earlier instruction is a control flow path altering instruction; and the outcome of the earlier instruction causes execution to proceed along the first control flow path or the second control flow path.

In these examples, a control flow path altering instruction refers to an instruction that can alter the stream of instructions to be executed by the processing circuitry. For such instructions, the outcome of the control flow path altering instruction (to be stored in the storage circuitry as described above) is an indication of a control flow path to be followed by subsequent instructions. The processing circuitry responds to a prediction of the outcome of the control flow path altering instruction by speculatively fetching and executing instructions from the predicted control flow path. Therefore, in situations where the earlier instruction is a control flow path altering instruction, the present technique can be applied to generate a prediction of the outcome when re-executing such an instruction.

In some examples, the earlier instruction is a branch instruction; and the outcome of the earlier instruction determines whether a branch is taken.

The earlier instruction could be a branch instruction which, when taken, identifies a particular control flow path to be followed by the processing circuitry, and identifies a different control flow path when the branch is not taken. The outcome of a branch instruction therefore indicates whether or not the branch is taken—for example, the outcome could be "taken" or "not taken", and subsequent instructions (e.g. the later instructions) can speculatively fetched and executed on the basis of a prediction of whether or not the branch is taken.

In some examples, the later instruction is a control flow path altering instruction; and the outcome of the later instruction causes execution to proceed along a third control flow path or a fourth control flow path.

In these examples, the outcome to be predicted by the processing circuitry—and the outcome to be stored in the storage circuitry—is whether execution should proceed via the third control flow path or the fourth control flow path. The present technique can therefore be used to predict the outcome (which control flow path) of the later instruction when it is re-executed.

In some examples, the later instruction determines a data value; and the prediction of the outcome of the later instruction predicts a value of the data value.

For example, the later instruction could be a load instruction to load a data value from memory, or an arithmetic instruction to calculate a value through an arithmetic instruction. The storage circuitry of the present technique can therefore store the data value calculated or read by that instruction, and use this stored value as a prediction if the instruction is re-executed.

In some examples, the earlier instruction determines a data value; the prediction of the outcome of the earlier instruction predicts a value of the data value; and the first control flow path and the second control flow path are the same.

As noted above, examples of such an instruction could include a load instruction to load a data value from memory, or an arithmetic instruction to calculate a value through an arithmetic instruction. In such examples, since the outcome of the instruction does not alter the control flow path of subsequent instructions, the first and second control flow paths can be considered to be the same. The later instruction is thus executed regardless of the result of the earlier instruction, making this a particularly advantageous situation in which the present technique can be applied.

Particular embodiments will now be described with reference to the figures.

FIG. 1 illustrates an example of a data processing apparatus 100 having a processing pipeline comprising a number of pipeline stages. The data processing apparatus 100 is an example of processing circuitry to speculatively execute an earlier instruction and a later instruction by generating a prediction of an outcome of the earlier instruction and a prediction of an outcome of the later instruction. The pipeline includes a base predictor 102 and a replay predictor 104 for predicting outcomes of instructions processed by the data processing apparatus 100. The base predictor 102 and the replay predictor 104 are each prediction circuits for predicting an outcome of an instruction, allowing subsequent instructions to be executed on the basis of the prediction. The base predictor 102 is a standard predictor and may, for example, predict the outcomes of instructions based on recorded history. The replay predictor 104, which will be discussed in more detail below, makes a prediction on the basis of a stored outcome of an earlier execution of the same instruction. The outputs of the base predictor 102 and replay predictor 104 are fed into selection circuitry 106, which selects between the predictions generated by these two predictors. The base predictor 102 is an example of further prediction circuitry and the selection circuitry 106 is an example of prediction selection circuitry. Note that each of the base predictor 102 and the replay predictor 104 could be branch predictors for predicting the outcome of branch instructions, or could be value predictors for predicting a data value that is determined by an instruction.

The pipeline also includes a fetch unit 108, which fetches instructions from the instruction cache 110 or other memory structures 112, 114. The fetch stage 108 fetches the instructions identified by the fetch addresses, and a decode stage 116 decodes the fetched instructions to generate control signals for controlling the subsequent stages of the pipeline. The instructions fetched by the fetch unit 108 may be dependent on the prediction supplied by the selection circuitry 106. In particular, if the prediction supplied by the selection circuitry 106 predicts that a branch will occur, then the instructions that are fetched will be at a location indicated by the branch.

A rename stage 118 performs register renaming to map architectural register specifiers identified by the instructions to physical register specifiers identifying registers provided in hardware. An issue stage 120 includes an issue queue which queues instructions awaiting execution until the required operands for processing those instructions are available in the registers, and selection circuitry to select instructions for execution by the execute stage 122. The execute stage 122 executes the instructions to carry out corresponding processing operations, and the results of the executed instructions are written back to the registers.

The execute stage 122 can include a number of execution units such as a branch unit 124 for evaluating whether branch instructions have been correctly predicted, an ALU (Arithmetic Logic Unit) 126 for performing arithmetic or logical operations, an FPU (Floating-Point Unit) 128 for performing operations using floating-point operands and a load/store unit 130 for performing load operations to load data from a memory system to the registers or store operations to store data from the registers to the memory system. In this example the memory system includes a level one instruction cache 110, a level one data cache 132, a level two cache 112 which is shared between data and instructions, and main memory 114, but it will be appreciated that this is just one example of a possible memory hierarchy and other implementations can have further levels of cache or a different arrangement. Access to memory may be controlled using a Memory Management Unit (MMU) for controlling address translation and/or memory protection. It will be appreciated that the pipeline shown in FIG. 1 is just one example and other examples may have different sets of pipeline stages or execution units. For example, an in-order processor may not have a rename stage 118.

Flush circuitry 134 is also provided. The flush circuitry 134 responds to certain triggers—such as an incorrect prediction by one of the base predictor 102 and the replay predictor 104—to generate a flush. A flush clears all non-completed instructions from the pipeline. The flush circuitry 134 is an example of flush circuitry to generate a flush in response to the prediction of the outcome of the earlier instruction being incorrect.

As discussed above, a replay predictor 104 may be provided to generate predictions of the outcomes of instructions. In particular, the replay predictor 104 stores the outcome of a previous execution of an instruction, carried out before a flush of the pipeline. The stored value can then be supplied, via the selection circuitry 106, to the fetch circuitry 108 as a prediction of the outcome of the same instruction when it is re-executed following a flush.

As discussed above, prediction circuitry 102, 104 may make predictions in respect of particular instructions prior to those instructions being executed by the execute unit 122. In particular, the outcome of an instruction may be predicted in order to determine which of a plurality of control flow paths is to be followed after execution of that instruction. This allows the fetch circuitry 108 to fetch the next set of instructions.

Figure 2:
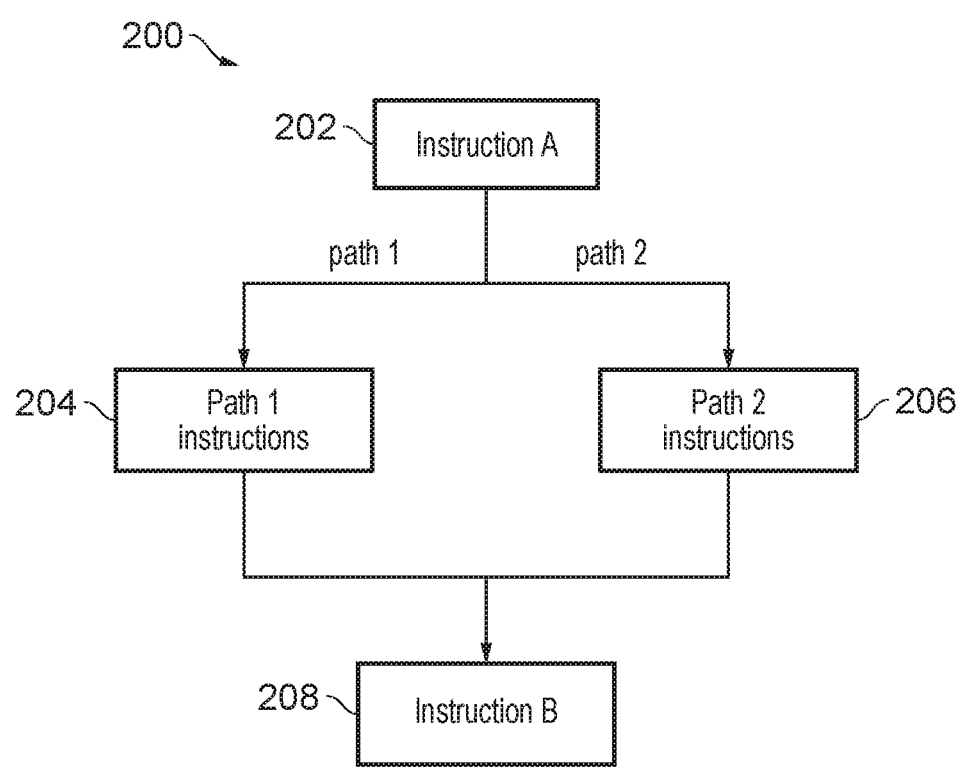
FIG. 2 illustrates convergent control flow paths in a stream of instructions.

FIG. 2 shows an example of a stream of instructions 200—for example, the sequence of instructions depicted in FIG. 2 indicates a predefined program order, which could be the order of the instructions as compiled by a compiler, or as provided by a programmer, for example. In particular, FIG. 2 shows an earlier instruction (instruction A) 202 which determines, based on its outcome, whether a first control flow path (path 1) or a second control flow path (path 2) is followed. If the first control flow path is followed, a first set of instructions (path 1 instructions) 204 are executed, followed by a later instruction (instruction B) 208. If the second control flow path is followed, a second set of instructions (path 2 instructions) 206 are executed, followed by the later instruction (instruction B) 208. In the example shown in FIG. 2, the first control flow path and the second control flow path re-converge, with the later instruction (instruction B) 208 being executed on both control flow paths—that is, the first control flow path and the second control flow path each comprise the later instruction 208. The earlier instruction 202 in this example is thus a control flow path altering instruction, for causing a particular control flow path to be followed. The later instruction 208 could also be a control flow path altering instruction. Alternatively, the later instruction 208 can be any other type of instruction for which a prediction may be generated—for example, it could be an instruction for predicting a data value.

In some examples, the earlier instruction 202 is a branch instruction, with one of the two paths being the "taken" path and one of the two paths being the not taken path.

By predicting the outcome of the first instruction 202 in advance—for example, using the base predictor 102—the fetch circuitry 108 is able to fetch subsequent instructions based on the prediction (e.g. the prediction of the outcome of the earlier instruction causes the first control flow path to be followed). This allows the subsequent instructions to be executed sooner than if the outcome of the later instruction (202) was not predicted, leading to an increase in performance.

In the event that the outcome of the earlier instruction 202 was incorrectly predicted, leading to the execution of instructions on the incorrect control flow path, the flush circuitry 134 is arranged to trigger a flush to remove the incorrectly executed instructions from the processing pipeline 2. The correct set of instructions, based on the correct outcome of the first instruction 202 can then be executed. In this case if the later instruction 208, which is on both the first control flow path and the second control flow path, has been executed (e.g. completed) prior to the flush being completed, this means that an identical instruction will be re-executed after the flush occurs. Furthermore, it could be expected that the second execution of this instruction will give the same result as the first execution of that instruction. This is a waste of processing resources, leading to an increase in power consumption and a decrease in performance. The present technique aims to overcome this decrease in performance and efficiency by using the replay predictor 104 to store the outcome of the later instruction 208 and use the stored outcome to predict its outcome during a second execution of the instruction.

Figure 3:
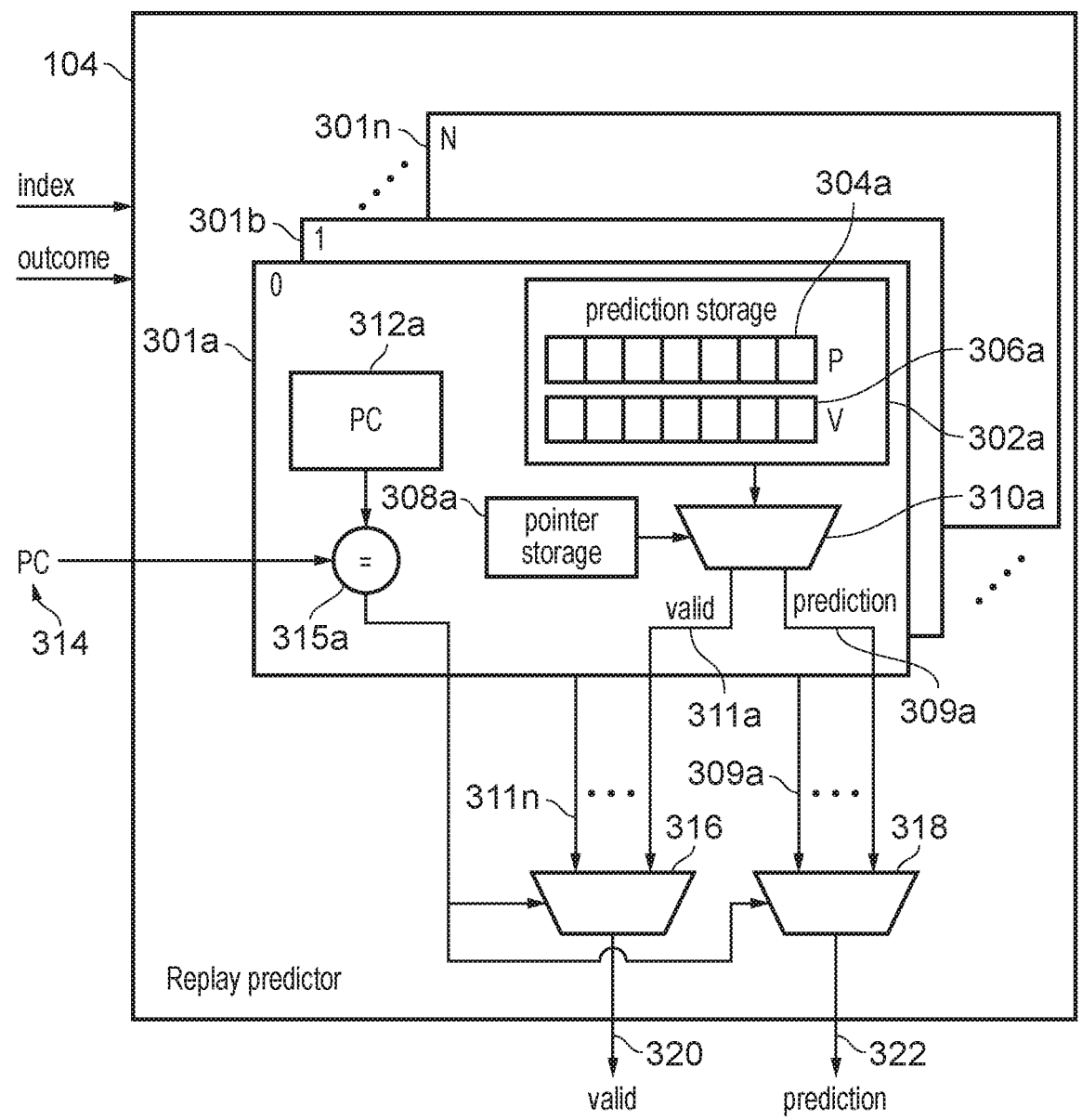
FIG. 3 schematically illustrates a replay predictor.

FIG. 3 shows an example of a replay predictor 104 in more detail. The replay predictor 104 comprises a plurality of prediction units 301a, 301b, . . . , 301n, each corresponding to one of a plurality of later instructions. For example, a first prediction unit 301a may correspond to the later instruction (instruction B) described above with reference to FIG. 2.

The first prediction unit 301a includes prediction storage circuitry 302a which is arranged to store the outcome of the later instruction, as executed on the incorrect control path—the prediction storage circuitry 302a being an example of storage circuitry to store the outcome of the later instruction in response to the later instruction completing. This outcome can then be read from the prediction storage 302a when re-executing the later instruction following a flush, in order to generate a more accurate prediction of the outcome of the instruction than can be generated using the base prediction circuitry.

A plurality of iterations of the later instruction could be executed prior to the completion of a flush, e.g. in a loop. Therefore, the prediction storage circuitry 302a in these examples is adapted to store a plurality of outcomes of the later instruction, each corresponding to one of the iterations. In the example of FIG. 3, the prediction storage circuitry 302a stores the plurality of outcomes of the later instruction as a first circular bit vector 304a. The prediction storage circuitry 302a of FIG. 2 also stores a second circular bit vector 306a to store a plurality of validity values (validity indicators/validity bits), each corresponding to one of the iterations of the later instruction. In this example, each outcome is stored as a single bit, and each validity value is stored as a single bit (e.g. as a "1" or a "0"). This allows the outcomes of a plurality of iterations of the later instruction to be stored in the prediction storage circuitry 302a in a compact and efficient manner, reducing the circuit area required to implement the prediction storage circuitry 302a. For example, if the later instruction is a branch instruction and the outcome is therefore taken or not taken, a value of 0 may be stored when the outcome is not taken and a value of 1 may be stored when the outcome is taken. Each bit position in the circular bit vector 304a corresponds to a particular iteration of the instruction.

The validity vector 306a allows a validity bit to be stored for each iteration of the later instruction, indicative of whether a corresponding iteration of the later instruction has been completed. For example, a value of 1 stored in a given bit position of the validity vector may indicate that a corresponding iteration of the later instruction has been completed and a corresponding outcome has been stored, whereas a value of 0 may indicate that the corresponding iteration of the later instruction has not been completed.

In order to identify which iteration of the later instruction is the current iteration, pointer storage circuitry 308a is provided to store a pointer indicating which bit position of the prediction vector and the validity vector corresponds to the current iteration of the later instruction.

As discussed above, following the generation of a flush by the flush circuitry 134, the later instruction may need to be re-executed (for example, if it is on both the incorrect control flow path and the correct control flow path). When re-executing the later instruction, a prediction of the outcome of the later instruction is generated, to enable subsequent instructions to be speculatively executed. To generate a prediction of the outcome of a given iteration of the later instruction, the output of the pointer storage circuitry 308a and the output of the prediction storage 302a can then be fed into a multiplexer 310a to allow a validity value 311a and a prediction 309a corresponding to the current iteration to be output.

Program counter storage 312a is also provided to store a program counter value corresponding to the later instruction. To retrieve a prediction from the replay predictor 104 for a particular instruction, a program counter value 314 corresponding to the program counter for the instruction to be executed is input into the replay predictor 104. In each prediction unit 301, this is compared using comparison circuitry 315 with the stored program counter value 312, and the result of this comparison becomes the selection signal for a pair of multiplexers 316, 318, which receive as inputs a validity value 311 and a prediction 309 from each prediction unit 301. The validity value 311 and prediction value 309 corresponding to the current instruction—the instruction with a stored program counter value 312 equal to the input program counter value 314—are then selected by the multiplexers 316, 318. Provided that the selected validity value 320 indicates that the prediction is valid, the selected prediction 322 can then be used to predict the outcome of the further instruction.

Replay prediction circuitry 104 as shown in FIG. 3 allows an accurate prediction of the later instruction to be generated rapidly, and enables the prediction based on the outcome of an actual execution of that instruction from the incorrect control flow path.

Figure 4:
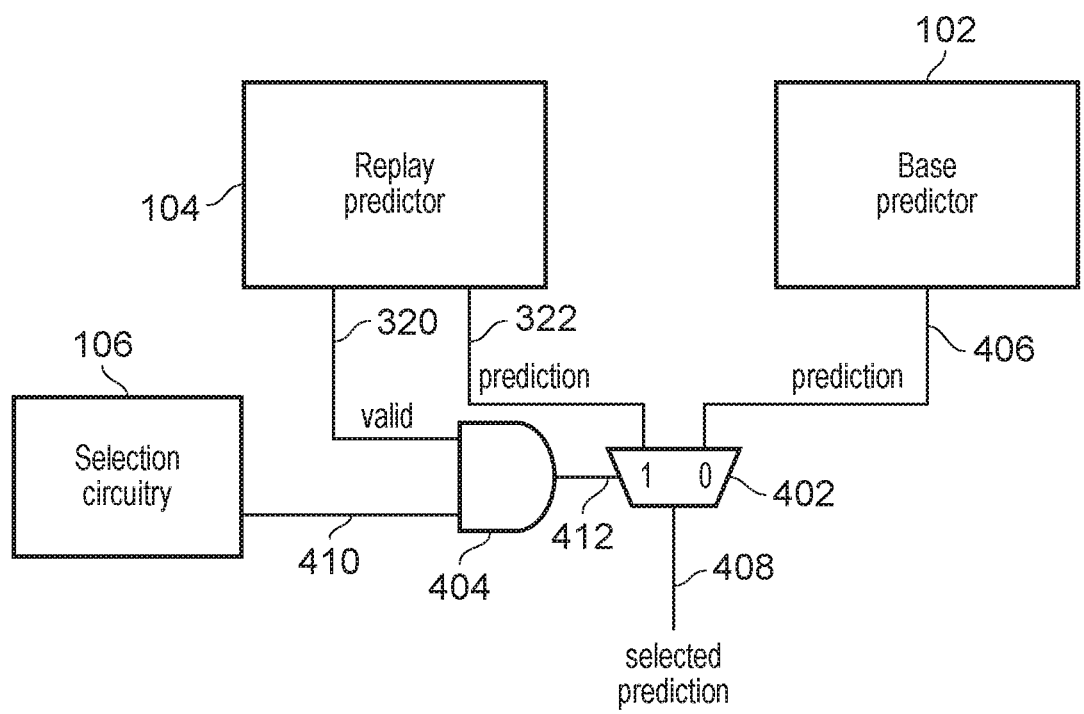
FIG. 4 illustrates the use of a replay predictor with a base predictor.

FIG. 4 shows how a replay predictor 104 can be implemented alongside a base predictor 102. The base predictor 102 is an example of further prediction circuitry to generate a further prediction of the outcome of the later instruction, and may be normal prediction circuitry provided in the data processing apparatus 100. For example, the base predictor 102—like the replay predictor 104—may be configured for predicting the outcomes of branch instructions, or value prediction circuitry, for predicting data values to be calculated by instructions. The base predictor 102 may generate predictions based on stored history data, for example using pattern history tables.

During execution of an instruction by the data processing apparatus 100, each of the replay predictor 104 and the base predictor 102 may produce a prediction. The replay predictor 104, as discussed above, outputs a prediction 322 and a validity value 320, and the base predictor 102 outputs a further prediction 406. The prediction 322 from the replay predictor 104 and the further prediction 406 from the base predictor 102 are fed into a multiplexer 402, which selects a selected prediction 408 from these two input predictions.

Selection circuitry 106 is also provided, to generate a prediction selection signal 410. The prediction selection signal 410 and the validity value 320 are input into an AND gate 404, and the output of the AND gate 404 is provided as the selection signal 412 for the multiplexer 402. In this way, if no valid prediction is stored in the replay predictor for the current instruction, the prediction from the base predictor is selected, due to a validity value of 0 being output by the replay predictor.

The selection circuitry 106 therefore allows the replay predictor 104 to be implemented alongside a base predictor 102. In such systems, the base predictor 102 can usually be relied upon to produce the prediction. However, in certain circumstances, the replay predictor 104 is able to 'override' the base predictor 102 by producing a prediction based on a rewound execution of an instruction. This allows the replay predictor 104 to be implemented in existing systems, without conflicting with existing prediction circuitry.

Figure 5C:
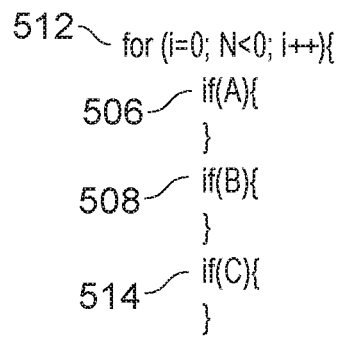

FIGS. 5A, 5B and 5C show examples of instruction streams for which the present technique may be beneficial. In FIG. 5A, an earlier instruction 502 (which is an example of the earlier instruction in FIG. 2) is an "if" instruction with a hard to predict condition. This may mean that it takes a long time (e.g. numerous processor cycles) for the earlier instruction 502 to be resolved (executed). As a result, if a later instruction 504 (which is an example of the later instruction in FIG. 2) can be executed faster than the earlier instruction 502, the later instruction could be resolved before the earlier instruction is resolved.

It should be noted that the later instruction 504 follows the earlier instruction 502 in the program order, but since the later instruction 504 does not depend on the outcome of earlier instruction 502, it can be executed regardless of the outcome of the earlier instruction 502. That is, the later instruction 504 should be considered to be on any control path following the earlier instruction 502. For example, the earlier instruction 502 could be a branch instruction in which both control flow paths (the taken path and the not-taken path) re-converge to allow the later instruction 504 to be executed. Alternatively, the earlier instruction 502 could be a data value instruction for generating a data value—such as an arithmetic instruction—for which a prediction of the data value is made. In this case, the earlier instruction is not a control flow path altering instruction, so there is only one control path that can be followed after the earlier instruction 502.

Figure 5B illustrates another example of an instruction stream in which the present technique is implemented. In the example of FIG. 5B, an earlier instruction 506 (an example of the earlier instruction 202 of FIG. 2) and a later instruction 508 (an example of the later instruction 208 of FIG. 2) are instructions within a "for" loop 510. In this example, if the later instruction 508 can be executed quickly, it could be executed multiple times before the outcome of the earlier instruction 506 is known. Therefore, it is useful in this instance for the outcomes of multiple iterations of the later instruction 508 to be stored in the prediction storage circuitry 302 of the replay predictor 104. This can be achieved using prediction storage circuitry 302 as described with reference to FIG. 3, which is capable of compactly storing a plurality of outcomes of the later instruction as a first circular bit vector 304.

FIG. 5C shows another example of an instruction stream in which the present technique mat be implemented. The example shown in FIG. 3 shows a "for" loop 512 that is similar to the "for" loop 510 of FIG. 5B, except that it includes an additional instruction 514. Thus, the instruction stream depicted in FIG. 5C comprises an earlier instruction 506 and two later instructions 508, 514. In this example, both later instructions 508, 514 are resolved before the outcome of the earlier instruction 506 is known, so that it would be beneficial to be able to store the outcomes of both later instructions 508, 514 in the replay predictor 104. This is achieved using the multiple prediction units 301 of the replay predictor 104—in particular, the outcome of one of the later instructions 508 is stored in the prediction storage circuitry 302 of a first prediction unit 301a, and the outcome of the other later instruction 514 is stored in the prediction storage circuitry of a second prediction unit 301b. In this way, the outcomes of a plurality of later instructions 508, 514 are predicted using the replay predictor 104.

Figure 6:
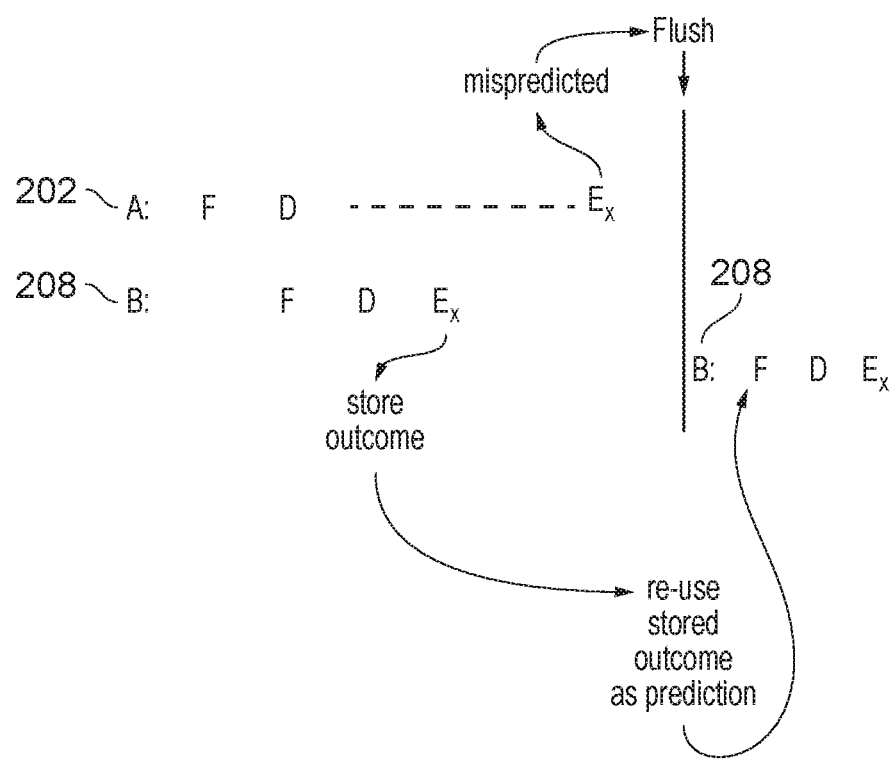
FIG. 6 illustrates an example of how a replay predictor can be used.

FIG. 6 schematically illustrates the execution of the earlier instruction 202 and the later instruction 208 of FIG. 2, in accordance with the present technique. In these examples, the instructions are executed in order, meaning that the earlier instruction 202 is fetched in a first processing cycle. In the next processing cycle, the earlier instruction 202 is decoded while the later instruction 208 is fetched. However, in this example, the earlier instruction 202 takes a long time to execute, so that execution of the earlier instruction 202 is not completed until many cycles later. Meanwhile, the execution of the later instruction 208 is carried out more quickly, based on a prediction of the outcome of the earlier instruction 202, in the processing cycle following the decoding of the earlier instruction 208. This means that the outcome of the later instruction 208 is known before the outcome of the earlier instruction 202 is known.

Given that the later instruction 208 was fetched based on a prediction of the outcome of the earlier instruction 202, the later instruction 208 is flushed from the processing circuitry if it is subsequently determined that the earlier instruction 202 was miss-predicted. However, as discussed with reference to FIG. 2, the later instruction 208 will be re-executed after the flush.

Therefore, during the initial execution of the later instruction 208 (on the incorrect control flow path), the outcome of the later instruction is stored in the replay predictor 104. In the example of FIG. 6, it is later determined that the earlier instruction 202 was miss-predicted, leading to a flush. This means that the later instruction 208 needs to be re-executed, as shown. However, since the outcome of the previous execution of the later instruction 208 was stored in the replay predictor, this outcome can be re-used when predicting the outcome of the later instruction 208 during the re-execution. This allows a more accurate prediction of the later instruction 208 to be generated than can be generated by the base prediction circuitry, since it relies on the outcome of an actual execution of the same instruction. This, therefore, leads to an improvement in the performance and efficiency of the system, by significantly reducing the likelihood of a flush later being needed.

Although, in the example of FIGS. 2 and 6, the earlier instruction 202 and the later instruction 208 are executed in order, the present technique is also applicable where the instructions are executed out of order with respect to a predefined program order (e.g. where the later instruction 208 is issued before the earlier instruction 202).

Figure 7:
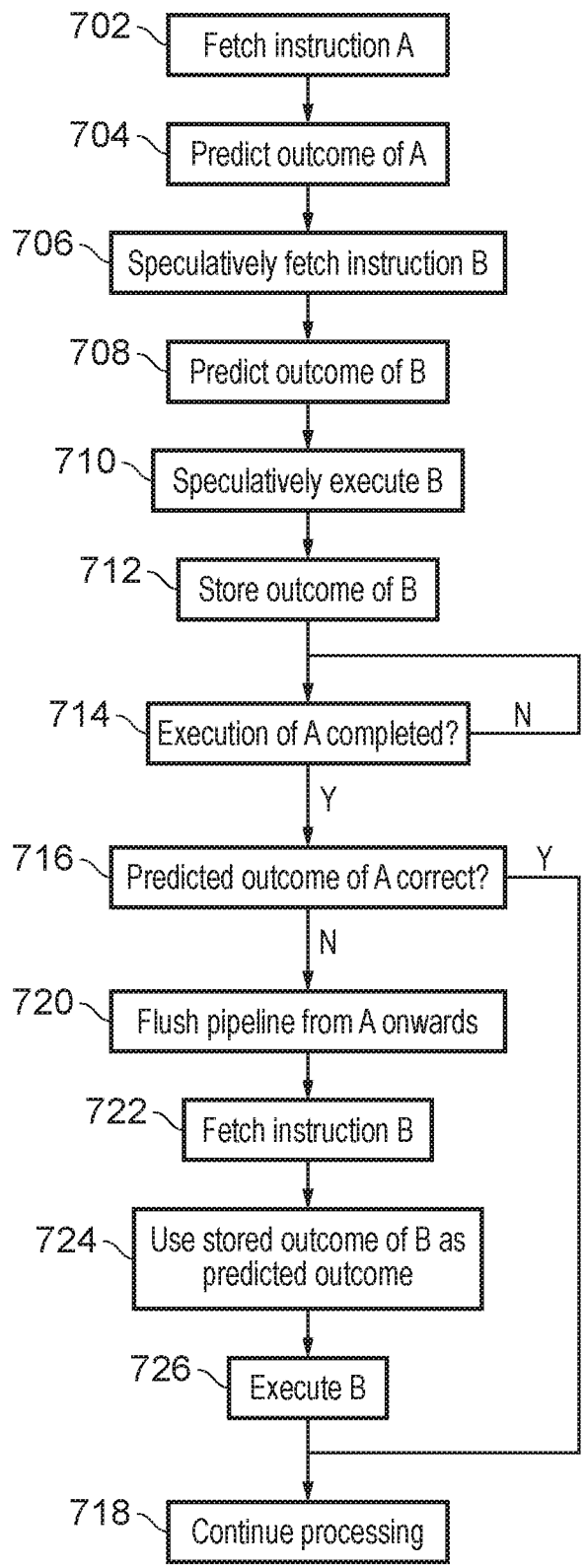
FIG. 7 is a flow diagram illustrating a method of using a replay predictor to predict the outcome of a later instruction.

FIG. 7 is a flow diagram illustrating a method in accordance with examples of the present technique. According to the method of FIG. 7, an earlier instruction (instruction A) is fetched in a step 702. The processing circuitry 100 then predicts an outcome of instruction A 704 and uses that prediction to speculatively fetch instruction B 706. As discussed above, in this situation, instruction B is fetched regardless of the outcome or the predicted outcome of instruction A, since instruction B is on both the correct control flow path and the incorrect control flow path. Once instruction B has been fetched, the outcome of instruction B is predicted 708. Instruction B is then executed speculatively 710. Instruction A is also speculatively executed; it may be that the processing circuitry is set up for out-of-order execution of instructions, allowing instruction B to be speculatively executed before instruction A is executed. Alternatively it may be simply be that execution of instruction B is completed more quickly than execution of instruction A. In either situation, the outcome of instruction B is known prior to the execution of instruction A being completed, so the outcome of instruction B is stored in the replay predictor in a step 712. Once the execution of instruction A has completed 714, the processing circuitry 100 can determine whether the predicted outcome of instruction A was correct 716. If the predicted outcome of instruction A was correct, processing can continue 718. However, if the predicted outcome of instruction A turns out to have been incorrect, the processing pipeline 100 is flushed 720. As a result, instruction B needs to be re-fetched 722 and re-predicted 724. However, since the outcome of the previous execution of instruction B was stored in the replay predictor, the prediction of instruction B during the re-execution can be generated using the stored outcome of the first execution. Once instruction B has been predicted it can be executed 726 and processing can continue 718.

As has been shown, a replay predictor may be used to store the outcome of a later instruction executed on the incorrect control flow path, following a miss-prediction of an earlier instruction. Following a flush, the outcome of the later instruction may be predicted more quickly and more accurately during its re-execution following the flush by basing the prediction on the stored outcome.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
processing circuitry to speculatively execute an earlier instruction and a later instruction by generating a prediction of an outcome of the earlier instruction and a prediction of an outcome of the later instruction, wherein the prediction of the outcome of the earlier instruction causes a first control flow path to be executed;
storage circuitry to store the outcome of the later instruction in response to the later instruction completing; and
flush circuitry to generate a flush in response to the prediction of the outcome of the earlier instruction being incorrect,
wherein when re-executing the later instruction in a second control flow path following the flush, the processing circuitry is adapted to generate the prediction of the outcome of the later instruction as the outcome stored in the storage circuitry during execution of the first control flow path.

2. The apparatus of claim 1, wherein:
the first control flow path and the second control flow path each comprise the later instruction.

3. The apparatus of claim 1, wherein:
the earlier instruction is earlier in a predefined program order than the later instruction; and
the processing circuitry completes execution of the later instruction before the flush is completed.

4. The apparatus of claim 3, wherein:
the later instruction and the earlier instruction are issued out of order with respect to the program order.

5. The apparatus of claim 1, wherein:
the storage circuitry stores a validity indicator indicative of whether the later instruction completed in the first control flow path; and
the processing circuitry generates the prediction of the outcome of the later instruction as the outcome stored in the storage circuitry during execution of the first control flow path when the validity indicator indicates that the later instruction has previously been completed.

6. The apparatus of claim 1, wherein:
the processing circuitry executes a plurality of iterations of the earlier instruction and a plurality of iterations of the later instruction;
the storage circuitry stores a plurality of outcomes of the later instruction, each corresponding to one of the plurality of iterations of the later instruction; and
for each iteration of the later instruction, when re-executing that iteration of the later instruction in the second control flow path following the flush, the processing circuitry is adapted to generate the prediction of that iteration of the outcome of the later instruction as the outcome stored in the storage circuitry for that iteration during execution of the first control flow path.

7. The apparatus of claim 6, comprising:
pointer storage circuitry to store a pointer indicating which of the plurality of outcomes of the later instruction corresponds to a current iteration of the later instruction.

8. The apparatus of claim 7, wherein:
the pointer is advanced following each prediction of the later instruction; and
following the flush, the pointer is returned to a state occupied by the pointer when the earlier instruction was predicted.

9. The apparatus of claim 1, wherein:
the processing circuitry speculatively executes a plurality of later instructions by generating predictions of a plurality of outcomes, each corresponding to one of the plurality of later instructions; and
the storage circuitry stores the plurality of outcomes, wherein each of the plurality of outcomes is stored in response to a corresponding one of the plurality of later instructions completing.

10. The apparatus of claim 9, wherein:
the storage circuitry stores the outcomes of the plurality of later instructions as a circular bit vector.

11. The apparatus of claim 10, wherein:
the storage circuitry stores a plurality of validity indicators as a further circular bit vector, wherein each of the plurality of validity indicators is indicative of whether a corresponding one of the plurality of later instructions completed in a previous control flow path.

12. The apparatus of claim 1, comprising:
further prediction circuitry to generate a further prediction of the outcome of the later instruction; and
prediction selection circuitry to select, as a selected prediction, the prediction of the outcome of the later instruction or the further prediction of the outcome of the later instruction.

13. The apparatus of claim 12, wherein:
the storage circuitry stores a validity indicator indicative of whether the later instruction has previously completed;
the processing circuitry generates the prediction of the outcome of the later instruction as the outcome stored in the storage circuitry during execution of the first control flow path when the validity indicator indicates that the later instruction has previously been completed; and
unless the validity indicator indicates that the later instruction has previously completed, the prediction selection circuitry selects the further prediction of the outcome of the later instruction as the selected prediction.

14. The apparatus of claim 1, wherein:
the earlier instruction is a control flow path altering instruction; and
the outcome of the earlier instruction causes execution to proceed along the first control flow path or the second control flow path.

15. The apparatus of claim 14, wherein:
the earlier instruction is a branch instruction; and
the outcome of the earlier instruction determines whether a branch is taken.

16. The apparatus of claim 1, wherein:
the later instruction is a control flow path altering instruction; and
the outcome of the later instruction causes execution to proceed along a third control flow path or a fourth control flow path.

17. The apparatus of claim 1, wherein:
the later instruction determines a data value; and
the prediction of the outcome of the later instruction predicts a value of the data value.

18. The apparatus of claim 1, wherein:
the earlier instruction determines a data value;
the prediction of the outcome of the earlier instruction predicts a value of the data value; and
the first control flow path and the second control flow path are the same.

19. A method comprising:
speculatively executing an earlier instruction and a later instruction by generating a prediction of an outcome of the earlier instruction and a prediction of an outcome of the later instruction, wherein the prediction of the outcome of the earlier instruction causes a first control flow path to be executed:
storing the outcome of the later instruction in response to the later instruction completing;
generating a flush in response to the prediction of the outcome of the earlier instruction being incorrect; and
when re-executing the later instruction in a second control flow path following the flush, generating the prediction of the outcome of the later instruction as the outcome stored during execution of the first control flow path.

20. An apparatus comprising:
means for speculatively executing an earlier instruction and a later instruction by generating a prediction of an outcome of the earlier instruction and a prediction of an outcome of the later instruction, wherein the prediction of the outcome of the earlier instruction causes a first control flow path to be executed;
means for storing the outcome of the later instruction in response to the later instruction completing;
means for generating a flush in response to the prediction of the outcome of the earlier instruction being incorrect; and
means for generating the prediction of the outcome of the later instruction as the outcome stored during execution of the first control flow path, when re-executing the later instruction in a second control flow path following the flush.

* * * * *